(No Model.)

T. LEE.
DUST SEPARATOR.

No. 498,557. Patented May 30, 1893.

Attest
D. H. Taylor.
O. Le G. Peirce.

Inventor
Thomas Lee
by Chas. Spengel Atty

UNITED STATES PATENT OFFICE.

THOMAS LEE, OF HOME CITY, OHIO.

DUST-SEPARATOR.

SPECIFICATION forming part of Letters Patent No. 498,557, dated May 30, 1893.

Application filed February 14, 1893. Serial No. 462,236. (No model.)

*To all whom it may concern:*

Be it known that I, THOMAS LEE, a citizen of the United States, residing at Home City, in the county of Hamilton and State of Ohio, have invented certain new and useful Improvements in Dust-Separators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in dust-separators such as are used in manufacturing establishments where the accumulating waste, shavings, &c., are carried to a dust or shaving house, by the suction caused by air currents generated by fans or blowers. The office of dust-separators in such connection is to prevent the air-current from entering the waste-chamber, where by reason of its agitation it would interfere with the settling of dust and waste. In dust-separators as they are constructed now, the air-current carrying dust and waste enters usually the former on a tangential line and the point of entrance being often fixed by existing conditions in buildings, such entrance has to be located in a manner to meet such conditions. This results in what is termed "right and left hand separators."

My object is to do away with such tangential entrance, having in its place a central one, which obviates such special fitting, and meeting all requirements, permits the separator to be set up in any place.

In the following specification and particularly pointed out in the claims, is found a full description of my invention, its operation, parts and construction, the latter being also illustrated in the accompanying drawings, in which—

Figure 1:
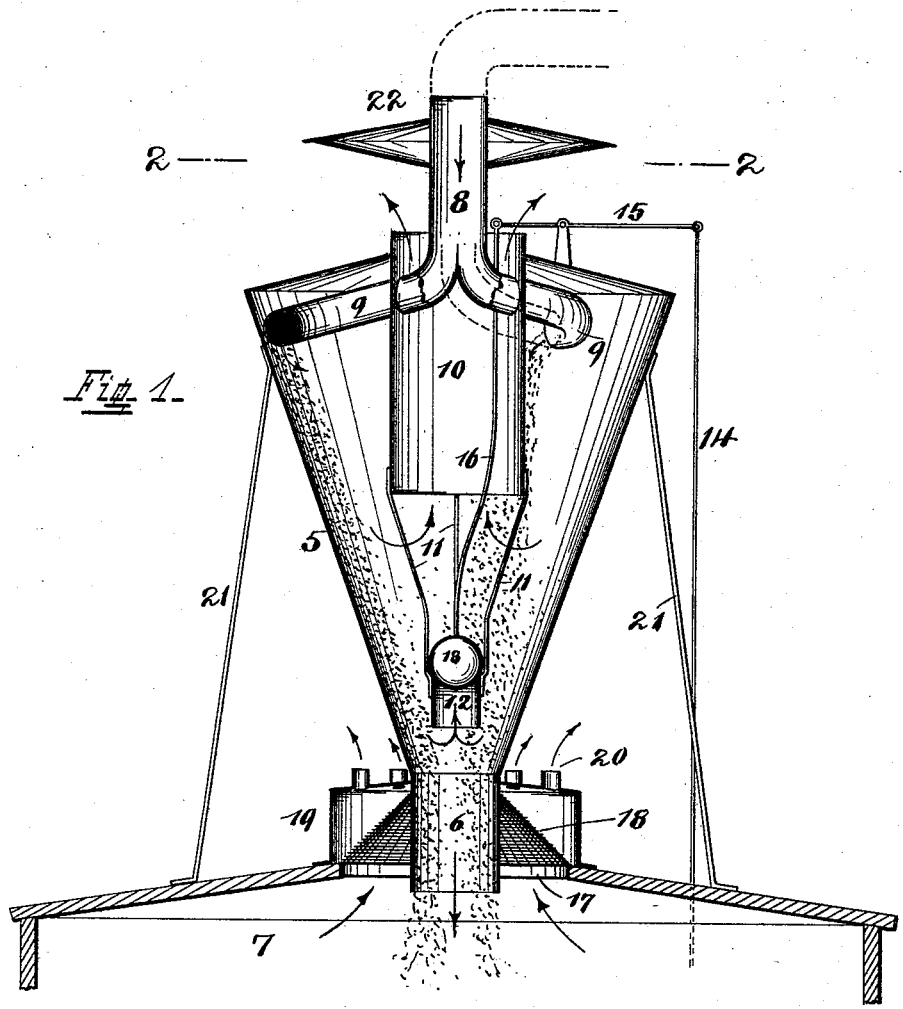
Figure 2:
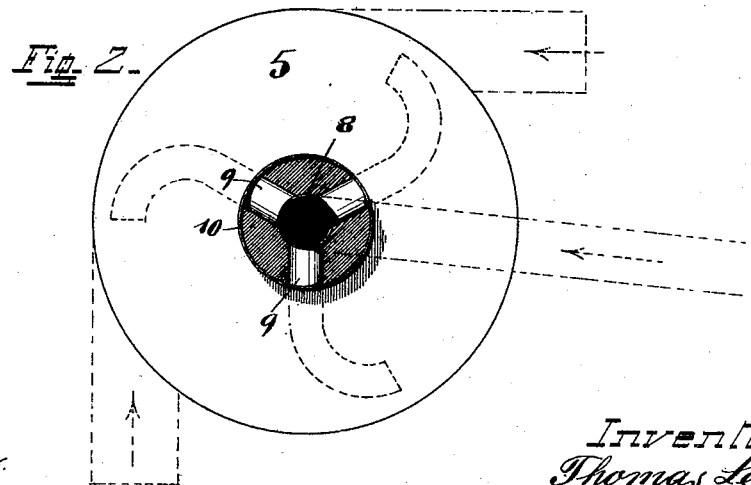

Figure 1 shows in a central vertical section a dust-separator in position, and connected to a dust-chamber. Fig. 2 is a top view of the same, parts above line 2—2 of Fig. 1 omitted.

Referring to the drawings, 5 is the dust-separator proper, being substantially in the shape of an inverted cone, and provided at its contracted part with a neck 6, through which it communicates with a dust-chamber 7. The pipe or conductor, carrying the waste and dust-laden air-current, enters centrally and from above, connecting to a vertical conduit 8, which forms a part of the separator and permits the same to be readily set up in any position, to meet and be connected with the pipe system. In the old way where the air enters tangentially such is not possible and the dust-separator has to be constructed in a manner that its point of entrance may meet existing pipes, as shown by dotted lines in Fig. 2, where two different ways of entrance are shown, neither one of which could be used under all conditions and in a manner as may be done with my improved form.

For the purpose of permitting the waste to separate readily, conduit 8, immediately after entering the body of the separator, divides into branches 9, whereby at once the force of the air-current is broken and weakened in a manner to make it incapable of reaching and entering the shaving-chamber 7. The change of direction from conduit 8, to branches 9, occurs through a gradual curve which prevents retardation of the free passage of air and prevents back pressure against the fan or blower. The so divided dust-laden air strikes the interior of the separator, after which during the passage down toward neck 6, a complete separation takes place, the waste continuing passing down, while the air passes up and out through a central flue 10. Immediately above the neck is suspended by rods 11, a shorter and smaller flue 12, passage through which is controlled by a ball-valve 13. If for some reason the air-current is so strong that part of it escapes down with the waste, creating a pressure and causing agitation in the dust-chamber, such may be prevented by opening or lifting this ball-valve whereupon such excess of air passes up through flue 12, and joins the main body of the separated air, passing out with it through flue 10. This valve is operated by a pull-rod 14, connected to a lever 15, from the other end of which by a link 16, the valve is suspended.

In addition to the manner of preventing air from entering chamber 7, I provide a permanent air-escape which surrounds the neck 6, of the separator. For this purpose a circular opening 17, is arranged around neck 6, and closed by a screen 18, the latter being in an inclined position, to prevent lodgment of dust and waste, which drops back when carried against it from below. This screen is protected against rain by a cap 19, provided with openings 20, through which the air escapes.

21 are legs which support the body of the separator and 22 is a combined deflector and hood to prevent rain from entering from above. It is supported by conduit 8, which it surrounds and to which it is connected.

Having described my invention, I claim as new—

1. A dust-separator, consisting substantially of a separating chamber 5, having an outlet opening for the separated waste, a flue 10 for the separated air to escape, an inlet conduit of smaller diameter than the latter entering through the same and spreading into several branches which enter the separating chamber discharging near the circular wall of the latter which they approach and which are so curved as to cause their discharge to be tangential to such wall.

2. A dust-separator of inverted conical shape, provided with an inlet conduit for the dust-laden air, centrally and from above, an outlet opening for the separated air, an outlet opening for the separated waste, a flue 12, located between these openings, and a valve controlling the passage through this flue.

3. A dust-separator of inverted conical shape, provided with an inlet conduit for the dust-laden air, centrally and from above, which inlet spreads into several branches inside, after having entered the separator, a central flue 10, through which the separated air escapes, an outlet opening for the separated waste, a dust-chamber with which this opening communicates, a flue 12, which permits the return of air from the dust-chamber, and a valve which controls this flue.

4. A dust-separator of inverted conical shape, provided with an inlet conduit for the dust-laden air, centrally and from above, an outlet opening for the separated air, and an outlet opening for the separated waste, a dust-chamber with which this latter opening communicates, an opening 17, surrounding the lower part or neck 6, of the dust-separator, an inclined screen 18, closing this opening, and a cap 19, provided with air outlets to protect this screen against rain.

5. A dust-separator of inverted conical shape, provided with an outlet-opening for the separated waste, a flue 10, through which the separated air escapes, an inlet conduit 8, passing down through flue 10, and spreading into several branches which enter the separator proper by piercing the walls of flue 10.

In testimony whereof I affix my signature in presence of two witnesses.

THOMAS LEE.

Witnesses:
ALFRED M. DAVIS,
C. SPENGEL.